United States Patent [19]

Ettlinger et al.

[11] Patent Number: 4,721,530

[45] Date of Patent: Jan. 26, 1988

[54] METHOD FOR INCREASING THE THICKENING ACTION OF PYROGENICALLY PRODUCED SILICON DIOXIDE

[75] Inventors: Manfred Ettlinger, Karlstein; Johann Mathias, Maintal; Guenter Stadtmueller, Alzenau-Hoerstein, all of Fed. Rep. of Germany

[73] Assignee: Degussa Aktiengesellschaft, Frankfurt am Main, Fed. Rep. of Germany

[21] Appl. No.: 924,668

[22] Filed: Oct. 30, 1986

[30] Foreign Application Priority Data

Nov. 29, 1985 [DE] Fed. Rep. of Germany ....... 3542240

[51] Int. Cl.$^4$ ................................................ C08C 1/28
[52] U.S. Cl. ................................ 106/308 N; 524/243; 524/244; 524/245; 106/316
[58] Field of Search ................... 106/308 N; 524/243, 524/244, 245

[56] References Cited

U.S. PATENT DOCUMENTS

| | | | |
|---|---|---|---|
| 3,841,888 | 10/1974 | Belde et al. | 106/308 N |
| 3,928,276 | 12/1975 | Linden et al. | 106/308 N |
| 4,186,124 | 1/1980 | Schimmel et al. | 106/308 N |

*Primary Examiner*—Lewis T. Jacobs
*Attorney, Agent, or Firm*—Beveridge, DeGrandi & Weilacher

[57] ABSTRACT

The utilization of ethoxylated polyethyleneamines for addition to aqueous dispersions of pyrogenically prepared silicon dioxide in order to obtain an increase of the thickening action thereof.

12 Claims, No Drawings

METHOD FOR INCREASING THE THICKENING ACTION OF PYROGENICALLY PRODUCED SILICON DIOXIDE

The present invention pertains to a method for increasing the thickening action of pyrogenically produced silicon dioxide in aqueous dispersion.

It is known to add polyethyleneoxide group containing compounds to aqueous dispersions of pyrogenically produced silicon dioxide for increasing the thickening action of the silica. Compounds utilized for this purpose include for example polyethyleneglycols, ethoxylated amines, ethoxylated diamines and quaternary ethoxylated amines (see German AS No. 25 24 309).

It is the object of the invention to provide a method for increasing the thickening action of pyrogenically produced silicon dioxide in aqueous dispersion, wherein the feature of the invention resides in adding to the dispersion an ethoxylated polyethyleneamine.

In an advantageous embodiment of the invention, an ethoxylated polyethyleneamine is employed which has a molecular weight between 400 and 8000, preferably between 2000 and 4000.

The ethoxylated polyethyleneamine can be added to the aqueous dispersion in an amount of 0.1 to 4 weight percent, preferably 0.1 to 1.5 weight percent, based on the pyrogenically prepared silicon dioxide.

The preparation of ethoxylated polyethyleneamine is known in the art and can be obtained through the conversion of polyethyleneamine with ethylene oxide. The length of the polyethyleneamine chains and the extent of ethoxylation can vary in a wide range. These substances are obtained as viscous liquids or pastes and are easily solubilized in water. Particularly effective are compounds in the range of triethylenetetramine to octaethylenenonamine with ethoxylated gradient according to the length of the ethylene amine chain of 20 to 120 EO.

The polyethyleneamine chain does not need to be terminated with amino groups—which in accordance with conventional means can also be ethoxylated—but can at the designated positions also carry other residues, such as for example, ester groups, carboxylic acid amide groups, alkyl groups, aryl groups, alkoxyl groups or aroyl groups.

The ethoxylated polyethyleneamines useful for the present invention can have a molecular weight, which varies depending on the chain length and the number of ethoxylated groups, which ranges from 400 to 8000.

Advantageously, the viscosities obtained from the pyrogenically produced silicon dioxide and the additives used in accordance with the present invention are only slightly influenced by alkaline earth metal salts, which for example, are present as hardness builders in water, even in high concentrations.

The pyrogenically produced silicon dioxides are widely known in the art and any suitable one may be used for purposes of this invention. For example, the pyrogenically produced silica described in DE-PS No. 870 242 may be used in the examples herein.

The present invention is further illustrated by the following examples.

The viscosity is determined utilizing a Brookfield-Viscometer of the Colora Messtechnik GmbH company. The index of thixotropy is the quotion obtained by measuring the viscosity at 5 rpm and the viscosity measured at 50 rpm with a Brookfield Viscometer.

Comparative Example 1

3 g of pyrogenically produced silicon dioxide with a specific surface area (BET) of 205 $m^2/g$ and an average primary particle size of about 12 nm was stirred into 97 g of deionized water with a spatula and then was subsequently dispersed for 3 minutes with a dissolver vessel (toothed disk stirrer) at 3000 rpm (diameter of the disk is 5 cm). The determination of the viscosity as well as the thixotropy is obtained utilizing a Brookfield-Viscometer RVT. The value obtained at 5 rpm is 100 mPas and at 50 rpm, the value is 50 mPas. The quotion of the first and second value, the so-called thioxtropy index (II) was determined as 3.33.

EXAMPLE 1

As in Comparative Example 1, after the dispersion of a pyrogenically prepared silicon dioxide, about 0.03 g of an ethoxylated tetraethylenepentamine (30 EO), was added thereto and was dispersed for an additional 3 minutes under the same reaction conditions.
Viscosity: 12,000 mPas ( 5 rpm), 520 mPas (50 rpm).
Thixotropy Index: 23.1.
A suitable silica for use in this example is AEROSIL ® 200 manufactured by DEGUSSA.

Comparative Example 2

0.03 g of ethoxylated tetraethylenepentamine (30 EO) was dispersed for 3 minutes in deionized water without the addition of a pyrogenically prepared silicon dioxide under the identical reaction conditions given above.
Viscosity: 20 mPas ( 5 rpm), 10 mPas (50 rpm).
Thixotropy Index: 2.

EXAMPLE 2

In accordance with the procedures of Example 1, the experiment was repeated using an ethoxylated tetraethylenepentamine of 20 EO:
Viscosity: 7,600 mPas ( 5 rpm), 1,000 mPas (50 rpm).
Thixotropy Index: 7.6.

EXAMPLE 3

Example 1 was repeated except with 91 g water and 6 g of calcium chloride dissolved therein:
Viscosity: 8,800 mPas ( 5 rpm), 680 mPas (50 rpm).
Thixotropy Index: 12.9.

EXAMPLE 4

Example 1 was repeated except utilizing an ethoxylated polyethyleneamine with an average molecular weight of 3000.
Viscosity: 7,600 mPas ( 5 rpm), 1,200 mPas (50 rpm).
Thioxtropy Index: 6.3.

Comparative Example 3

Example 1 was repeated using an ethoxylated talgamine with 60 EO:
Viscosity: 2,250 mPas ( 5 rpm), 750 mPas (50 rpm).
Thioxtropy Index: 3.0.

Comparative Example 4

Example 1 was repeated using an polyethyleneglycol with a molecular weight of about 500.
Viscosity: 100 mPas ( 5 rpm), 80 mPas (50 rpm).
Thixotropy Index: 1.25.

Further variations and modifications of the present invention will become apparent to those skilled in the art from a consideration of the foregoing description which are intended to be encompassed by the claims appended hereto.

We claim:

1. A method for increasing the thickening action of an aqueous dispersion of pyrogenically produced silicon dioxide comprising adding to an aqueous dispersion of pyrogenically produced silicon dioxide a sufficient amount of an ethoxylated polyethyleneamine.

2. The method according to claim 1, wherein the molecular weight of the ethoxylated polyethyleneamine ranges between 400 and 8000.

3. The method according to claim 2, wherein the molecular weight ranges from between 2000 to 4000.

4. The method according to claim 1, wherein the polyethyleneamine is added in the amount of 0.1 to 4 weight percent based on the weight of the pyrogenically produced silicon dioxide.

5. The method according to claim 4, wherein the amount of polyethyleneamine added is 0.5 to 1.5 weight percent based on the weight of the pyrogenically produced silicon dioxide.

6. The method according to claim 1, wherein the polyethyleneamine has a viscosity which ranges from a viscous liquid to a paste and which is readily water soluble.

7. The method according to claim 1, wherein the polyethyleneamine is triethylenetetramine.

8. The method according to claim 1, wherein the polyethyleneamine is octaethylenenonamine.

9. The method according to claim 1, wherein the polyethyleneamine has ethoxy groups ranging from 20 to 120.

10. The method according to claim 1, wherein the polyethyleneamine is further substituted by a member selected from the group consisting of ester, carboxylic acid, alkyl, aryl, alkoyl and aroyl groups.

11. A composition comprising an aqueous dispersion of a pyrogenically produced silicon dioxide containing an amount of an ethoxylated polyethyleneamine sufficient to increase the thickening action of said silicon dioxide.

12. The composition as set forth in claim 11 wherein the amount of ethoxylated polyethyleneamine is 0.1 to 4 weight percent based on the pyrogenically prepared silicon dioxide.

* * * * *